United States Patent [19]

Marchand

[11] Patent Number: 5,257,219

[45] Date of Patent: Oct. 26, 1993

[54] SPECTRUM EQUALIZATION ARRANGEMENT

[75] Inventor: Philippe Marchand, Paris, France

[73] Assignee: U.S. Philips Corporation, New York, N.Y.

[21] Appl. No.: 762,525

[22] Filed: Sep. 18, 1991

[30] Foreign Application Priority Data

Sep. 18, 1990 [FR] France .................. 90 11492

[51] Int. Cl.$^5$ .............................................. G06G 7/02
[52] U.S. Cl. .................................... 364/825; 364/602
[58] Field of Search ............... 364/825, 724.2, 602; 375/11–14; 333/18, 28 R

[56] References Cited

U.S. PATENT DOCUMENTS

| | | | |
|---|---|---|---|
| 4,184,129 | 1/1980 | Macchi nee Danjon et al. | 364/724.2 X |
| 4,225,832 | 9/1980 | Faye | 364/825 X |
| 4,507,747 | 3/1985 | Houdard et al. | 364/724.14 X |
| 4,615,025 | 9/1986 | Vry | 375/12 X |
| 4,716,577 | 12/1987 | Oexmann | 333/18 X |
| 4,847,797 | 7/1989 | Picchi et al. | 364/724.2 X |
| 4,872,184 | 10/1989 | Yamaguchi et al. | 364/724.2 X |
| 5,088,109 | 2/1992 | Schenk | 333/18 X |

Primary Examiner—Tan V. Mai
Attorney, Agent, or Firm—Robert J. Kraus

[57] ABSTRACT

This equalization arrangement has an input (1) for a signal to be equalized (A) and an output (30) for producing an equalized signal (B), which arrangement is formed, on one hand, by at least a correction element (5, 10) having an input for a signal to be corrected, an output for a corrected signal and a control terminal for receiving control information (10, 20) determining the correction to be made and, on the other hand, an equalization measuring circuit (22) intended to measure the equalization caused by the arrangement so as to produce said control information. An element is constituted on the basis of a hybrid circuit (50, 51) having accesses (A1) for the signal to be corrected and the corrected signal (A3) and auxiliary accesses (A2, A4) into which at least a reflecting circuit (54, 56–59) is inserted having a variable reflection as a function of said control information.

11 Claims, 2 Drawing Sheets

SPECTRUM EQUALIZATION ARRANGEMENT

BACKGROUND OF THE INVENTION

The present invention relates to an equalization arrangement having an input for a signal to be equalized and an output for producing an equalized signal, which arrangement is formed, on one hand, by at least a correction element having an input for a signal to be corrected, an output for a corrected signal and a control terminal for receiving control information determining the correction to be made and, on the other hand, an equalization measuring circuit intended to measure the equalization caused by the arrangement so as to produce said control information.

Arrangements of this type are well known and find important applications especially in the field of digital data transmission over microwave links.

It will be known that microwave links are subject to the multipath phenomenon due to reflections of the microwave on various obstacles, more specifically, the ground.

These multiple paths deteriorate the spectrum of the transmitted wave. In order to avoid this deterioration, elements are included in the receiver which have reverse transfer functions which can be compared to propagation. With respect to this subject U.S. Pat. No. 4,870,658 can be referred to.

In the aforementioned patent, a first hybrid circuit is used for splitting elements into two channels (one phase-channel and one channel in phase opposition) which elements have been inserted in these channels, and a second hybrid circuit for producing the equilized signal by combining the signals coming from these two channels.

SUMMARY OF THE INVENTION

The present invention proposes an arrangement of this type which has a much simpler structure than that described in above-mentioned patent while presenting comparable performance.

Therefore, an arrangement of this type is characterized in that at least one element is formed on the basis of a hybrid circuit comprising accesses for the signal to be corrected and the corrected signal and auxiliary accesses into which at least a reflecting circuit is inserted which has a variable reflection as a function of said control information.

BRIEF DESCRIPTION OF THE DRAWING

The following description, accompanied by the annexed drawing figures all this given by way of non-limiting example, will make it better understood how the invention can be realised. In the drawing.

DESCRIPTION OF THE PREFERRED EMBODIMENT

Figure 1:
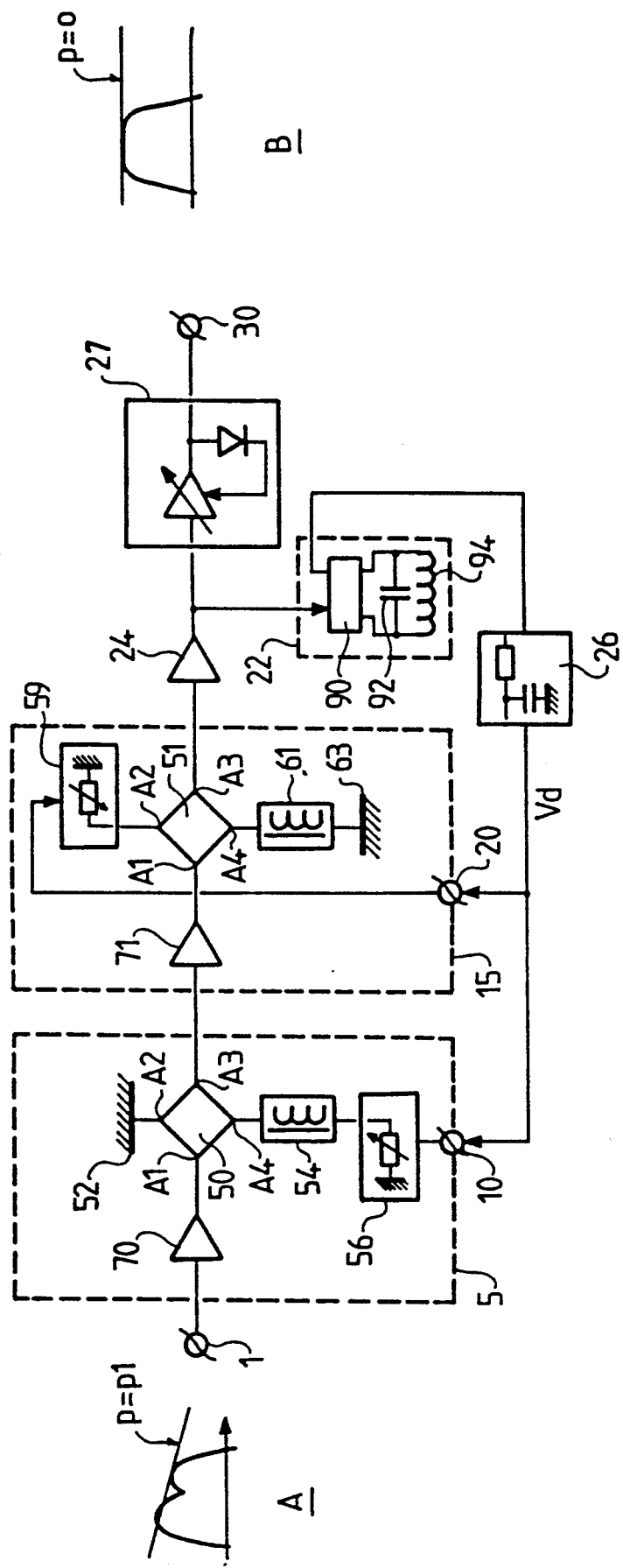
FIG. 1 represents an equalization arrangement according to the invention.

The terminal 1 shown in FIG. 1 represents the input terminal for a digital-type signal to be equalized. This input terminal is connected to a first equalization element 5 called minimum-phase circuit presenting a transfer function $H_m(\omega)$:

$$H_m(\omega) = 1 + \rho e^{-j\omega\tau} \qquad (1)$$

with $\omega$ being the frequency under discussion, $\tau$ a delay which will be explained hereinbelow, $\rho$ the parameter which varies as a function of a signal applied to the control terminal 10 of the element 5.

The output of the element 5 is connected to the input of a second equalization element 15, called non-minimum phase circuit, presenting a transfer function $H_{nm}(\omega)$:

$$H_{nm}(\omega) = \rho + e^{-j\omega\tau} \qquad (2)$$

where $\rho$ is defined by the signal applied to the control terminal 20 of the element 15.

The total transfer function $H(\omega)$ is written as:

$$H(\omega) = H_m(\omega) \cdot H_{nm}(\omega) = \rho + \rho^2 e^{-j\omega\tau} + e^{-j\omega\tau} + \rho e^{j\omega\tau}$$
$$= e^{-j\omega\tau}(1 + \rho^2 + 2\rho\cos\omega\tau)$$

It will be noted that there is no group time variation $\Delta tg$ because the group time $tg$ is constant:

$$tg = \frac{d(\omega t)}{d\omega} = \tau$$

Thus, the arrangement will affect the pulse transmission to a minor degree.

Figure 2:
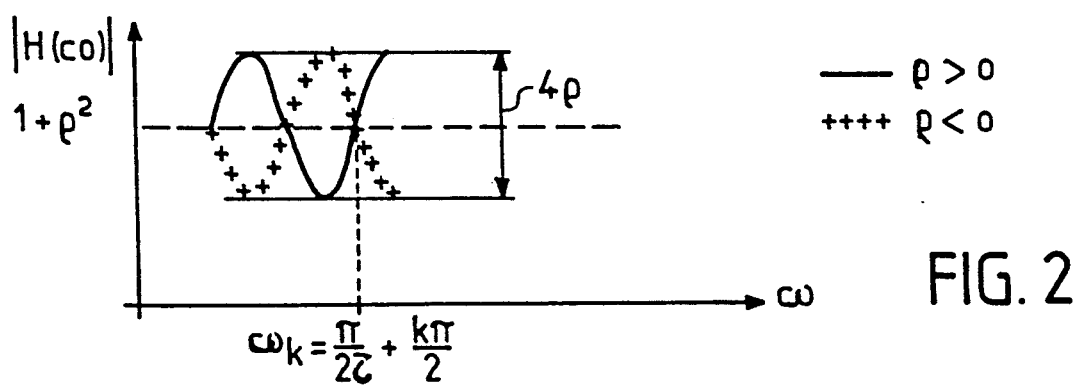
FIG. 2 represents the module variation of the transfer function of the arrangement according to the invention.

FIG. 2 represents the variation of $|H(\omega)|$ as a function of $\omega$: these variations are centered around the straight line $1+\rho^2$ and have the amplitude $4\rho$.

For an observation band $\Delta\omega$ which is small relative to $\pi/2$ and centered around $\omega_k$, the shape may be compared to a line segment whose slope (positive or negative) is a function of $\rho$, where $\omega k$ is the value of $\omega$ at which $|H(\omega)|$ crosses the straight line $1+\rho^2$.

Conversely, if the signal to be equalized is centered around $\omega_0$, one may choose $\tau = \tau_k = \pi/2\omega_0 + k\pi/\omega_0$ so that $H(\omega)$ fulfils the conditions required (k is an integer equal to 1, 2, ... ).

In order to suitably control this transfer function, there is provided a spectrum distortion measuring circuit 22 connected to the output of the element 15 by means of a buffer amplifier 24. The signal produced by the measuring circuit is applied to the control inputs 10 and 20 of the elements 5 and 15 by means of a control filter 26.

The output 30 of the arrangement is connected to the output of the amplifier 24 by means of a level adjusting circuit 27 of a conventional concept. At the input 1 is represented a spectrum of a signal A applied to the input 1 and distorted by propagation. As regards this signal it will be noted that the top of the spectrum is not horizontal and presents a certain slope $p = p_1$. The equalization arrangement will render this slope equal to 0, $p = 0$ (cf. B in FIG. 1) whence the name of slope corrector associated to this type of arrangement.

For realising this, the invention proposes correction elements of particularly advantageous structures. These elements are constituted on the basis of a single hybrid circuit 50, 51 for each of the respective equalization elements 5 and 15. These circuits 50 and 51 each comprise the accesses A1, A2, A3 and A4. They further include reflecting circuits connected to the accesses A2 and A4.

The reflecting circuit connected to the access A2 of the circuit 50 is formed by a short-circuiting mirror circuit 52 which produces a reflection coefficient $-1$, the reflecting circuit connected to the access A4 of the circuit 50 is formed by a delay line 54 and a mismatching circuit 56. The reflecting circuit connected to the access A2 of circuit 51 is formed by a mismatching circuit 59 and the reflecting circuit connected to the access A4 is formed by a delay line 61 and a short-circuiting mirror circuit 63.

The inputs of the equalization elements 5 and 15 are constituted by the respective inputs of the buffer amplifiers 70 and 71, the amplifier outputs are connected to the accesses A1 of the hybrid circuits 50 and 51; these amplifiers, not absolutely necessary, avoid the effects of the mismatches caused by the measures according to the invention.

The outputs themselves of the elements are constituted by the accesses A3 of the circuits 50 and 51.

The operation of the elements 5 and 15 is based on the following considerations:

The transfer function $H_{13}(\omega)$ of a hybrid circuit is equal to the difference between the reflection coefficients $\Gamma_2$ and $\Gamma_4$ (to the nearest multiplying coefficient) produced by the dipoles connected to the accesses A2 and A4:

$$H_{13}(\omega) = \Gamma_4 - \Gamma_2$$

for the element 5: where R(Vd) is the resistance presented by the circuit 56, and $Z_0$ is the characteristic impedance of the propagation means of the signals.

$$\Gamma_4 = \frac{R(Vd) - Z_0}{R(Vd) + Z_0} e^{-j\omega\tau} \quad (3)$$

$$\Gamma_2 = -1$$

where $$H_m = 1 + \frac{R(Vd) - Z_0}{R(Vd) + Z_0} e^{-j\omega\tau}$$

If R(Vd) varies from 0 to infinity, $$\frac{R(Vd) - Z_0}{R(Vd) + Z_0}$$

varies from $-1$ to $+1$; when combining this formula (3) with (1), one obtains:

$$\rho = \frac{R(Vd) - Z_0}{R(Vd) + Z_0} \quad (4)$$

for element 15:

$$\Gamma_4 = e^{-j\omega\tau} \quad (5)$$

$$\Gamma_2 = \frac{R(Vd) - Z_0}{R(Vd) + Z_0}$$

where $$H_{nm} = \frac{R(Vd) - Z_0}{R(Vd) + Z_0} + e^{-j\omega\tau}$$

in combination with the formula (2) one obtains the formula (4).

Figure 3:
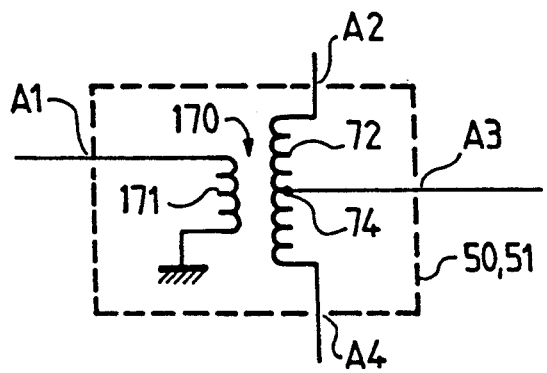
FIG. 3 represents an embodiment of the hybrid circuit.

FIG. 3 shows a preferred embodiment of the hybrid circuits 50 and 51 suitable for $\omega/2\pi = 70$ MHz.

The embodiment is constituted on the basis of a differential transformer 170 formed by a primary winding 171 and a secondary winding 72 having a central point. One end of the primary winding constitutes the access A1 connected to ground, one end of the secondary winding the access A2, the other end the access A4, and the central point the access A3.

Figure 4:
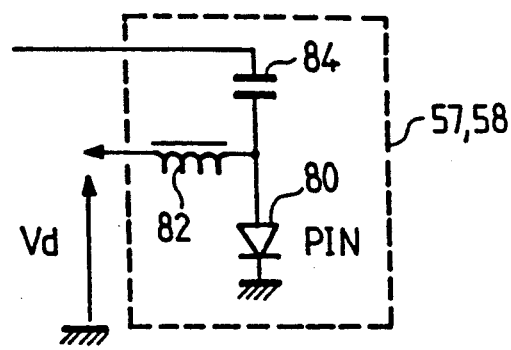
FIG. 4 represents an embodiment of the mismatching circuit.

The mismatching circuit 57, 58 shown in FIG. 4 is constituted on the basis of a PIN diode 80 whose anode-cathode path is biased by the voltage Vd through a decoupling self-induction coil 82. This diode is connected to the line 54 (element 5) or to the access A2 of the circuit 15 (element 15) through a powerful capacitor 84, which may thus be considered a short-circuit having the operating frequency under discussion.

Figure 5:
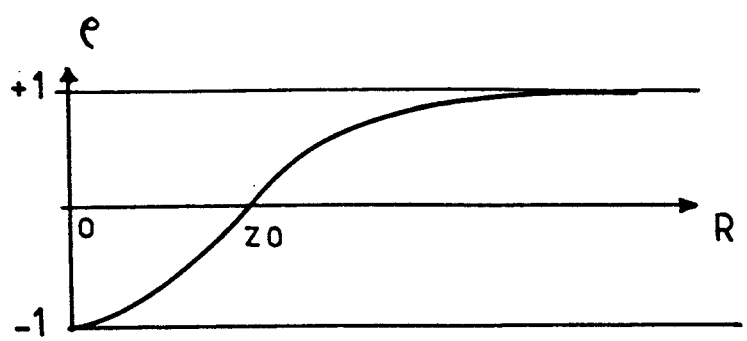
FIG. 5 represents the variation of the reflection coefficient effected by the mismatching circuit as a function of a parameter R.

If a good-quality PIN diode is taken, its resistance varies from 0 to practically infinity; FIG. 5 presents the associated value $\rho$ while equation 4 is taken into account. It should be observed that this value varies from $\rho = -1$ to $\rho = +1$.

It should also be noted that the lines 54 and 61 operate as reflectors and that for a given delay their length is two times smaller.

According to a preferred embodiment of the invention, the spectrum distortion measuring circuit is formed by an integrated circuit 90 intended to operate as a frequency discriminator of analog signals. A resonant circuit formed by a capacitor 92 and an inductance coil 94 is associated to this measuring circuit. The resonant circuit is controlled, within the framework of this embodiment, with 70 MHz and the integrated circuit is a circuit manufactured by PLESSEY under registration number SL1454.

I claim:

1. An equalization arrangement for receiving an input signal to be equalized and for producing an equalized output signal, said arrangement comprising:

a. correction means having an input for receiving said input signal, having an output at which said equalized output signal is produced, and having a control input for receiving a control signal representing control information for determining the correction to be made; and b. equalization measuring means having an input coupled to the correction means for measuring the equalization effected by the correction means and having an output for producing said control signal in response to said measurement;

the correction means including hybrid circuit means and variable signal reflecting means, said hybrid circuit means having a first access coupled to the correction means input, having a second access coupled to the correction means output, and having a third access coupled to the variable signal reflecting means, said variable signal reflecting means being coupled to the equalization measuring means output and having a variable reflection coefficient which varies as a function of the control signal.

2. An equalization arrangement as claimed in claim 1, comprising first and second of said correction means which are electrically connected in series and have respective first and second transfer functions $H_m(\omega)$ and $H_{nm}(\omega)$ which are, respectively:

$$H_m(\omega) = 1 + \rho e^{-j\omega\tau}$$

$$H_{nm}(\omega) = \rho + e^{-j\omega\tau}$$

with
$\rho$ being the variable reflection coefficient,
$\tau$ being a fixed delay,
$\omega$ representing the frequency,
characterized in that the hybrid circuit means of the first correction means comprises a fourth access coupled to a fixed signal reflecting means comprising a mirror circuit presenting a fixed reflection coefficient $\Gamma_2 = K$ and the variable signal reflecting means comprises a reflecting circuit including a delay line and a mismatching circuit for presenting a variable reflection coefficient:

$$\Gamma_4 = \left( \frac{R(Vd) - Z_0}{R(Vd) + Z_0} \right) e^{-j\omega\tau}$$

where:
R(Vd) is a variable resistance as a function of Vd which represents the control information,
$Z_0$ is the characteristic impedance of the propagation means of the signals to be corrected,
and $\tau$ is twice the delay caused by the delay line.

3. An equalization arrangement as claimed in claim 1 or 2, comprising first and second of said correction means which are electrically connected in series and have respective first and second transfer functions $H_m(\omega)$ and $H_{nm}(\omega)$ which are, respectively:

$$H_m(\omega) = 1 + \rho e^{-j\omega\tau}$$

$$H_{nm}(\omega) = \rho + e^{-j\omega\tau}$$

with
$\rho$ being the variable reflection coefficient,
$\tau$ being a fixed delay,
$\omega$ representing the frequency,
characterized in that the hybrid circuit means of the second connection means comprises a fourth access coupled to a fixed signal reflecting means comprising a delay line and a mirror circuit presenting a fixed reflection coefficient:

$$\Gamma_2' = e^{-j\omega\tau}$$

and the variable signal reflecting means comprises a mismatching circuit for presenting a variable reflection coefficient:

$$\Gamma_4' = \left( \frac{R(Vd) - Z_0}{R(Vd) + Z_0} \right)$$

where:
R(Vd) is a variable resistance as a function of Vd which represents the control information,
$Z_0$ is the characteristic impedance of the propagation means of the signal to be corrected,
and $\tau$ is twice the delay caused by the delay line.

4. An equalization arrangement as claimed in claim 3, characterized in that the variable signal reflecting means includes a PIN diode.

5. An equalization arrangement as claimed in claim 3, characterized in that the hybrid circuit means comprises a differential transformer.

6. An equalization arrangement as claimed in claim 3, characterized in that the equalization measuring means comprises a frequency discriminator.

7. An equalization arrangement as claimed in claim 6, characterized in that the frequency discriminator comprises an integrated circuit for cooperating with a resonant circuit.

8. An equalization arrangement as claimed in claim 1 or 2, characterized in that the variable signal reflecting means includes a PIN diode.

9. An equalization arrangement as claimed in claim 1 or 2, characterized in that the hybrid circuit means comprises a differential transformer.

10. An equalization arrangement as claimed in claim 1 or 2, characterized in that the equalization measuring means comprises a frequency discriminator.

11. An equalization arrangement as claimed in claim 10 characterized in that the frequency discriminator comprises an integrated circuit for cooperating with a resonant circuit.

* * * * *